United States Patent
Smaus et al.

(10) Patent No.: US 9,606,806 B2
(45) Date of Patent: Mar. 28, 2017

(54) DEPENDENCE-BASED REPLAY SUPPRESSION

(71) Applicant: Advanced Micro Devices, Inc., Sunnyvale, CA (US)

(72) Inventors: Gregory W. Smaus, Austin, TX (US); Michael Achenbach, Austin, TX (US); Christopher J. Burke, Austin, TX (US); Francesco Spadini, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 685 days.

(21) Appl. No.: 13/926,184

(22) Filed: Jun. 25, 2013

(65) Prior Publication Data

US 2014/0380023 A1 Dec. 25, 2014

(51) Int. Cl.
G06F 9/44 (2006.01)
G06F 9/38 (2006.01)

(52) U.S. Cl.
CPC .......... *G06F 9/3826* (2013.01); *G06F 9/3834* (2013.01); *G06F 9/3836* (2013.01); *G06F 9/3838* (2013.01); *G06F 9/3842* (2013.01); *G06F 9/3863* (2013.01)

(58) Field of Classification Search
CPC ....................................................... G06F 9/38
See application file for complete search history.

(56) References Cited

U.S. PATENT DOCUMENTS

| | | | |
|---|---|---|---|
| 6,249,862 B1 | 6/2001 | Chinnakonda et al. | |
| 6,385,715 B1 | 5/2002 | Merchant | |
| 6,735,688 B1 | 5/2004 | Upton | |
| 6,981,129 B1 | 12/2005 | Boggs | |
| 2003/0126406 A1 | 7/2003 | Hammarlund | |
| 2008/0028193 A1 | 1/2008 | Dhodapkar | |
| 2013/0013862 A1 | 1/2013 | Kannan | |
| 2014/0025933 A1 | 1/2014 | Venkataramanan | |
| 2014/0181476 A1* | 6/2014 | Srinivasan | G06F 9/30145 712/208 |

OTHER PUBLICATIONS

U.S. Appl. No. 13/926,193, filed Jun. 25, 2013, entitled "Dependent Instruction Suppression".

(Continued)

*Primary Examiner* — Cheng-Yuan Tseng

(57) ABSTRACT

A method includes selecting for execution in a processor a load instruction having at least one dependent instruction. Responsive to selecting the load instruction, the at least one dependent instruction is selectively awakened based on a status of a store instruction associated with the load instruction to indicate that the at least one dependent instruction is eligible for execution. A processor includes an instruction pipeline having an execution unit to execute instructions, a scheduler, and a controller. The scheduler selects for execution in the execution unit a load instruction having at least one dependent instruction. The controller, responsive to the scheduler selecting the load instruction, selectively awakens the at least one dependent instruction based on a status of a store instruction associated with the load instruction to indicate that the at least one dependent instruction is eligible for execution by the execution unit.

20 Claims, 4 Drawing Sheets

(56) References Cited

OTHER PUBLICATIONS

U.S. Appl. No. 13/943,264, filed Jul. 16, 2013, entitled "Dependent Instruction Suppression".
U.S. Appl. No. 13/943,310, filed Jul. 16, 2013, entitled "Dependent Instruction Suppression in a Load-Operation Instruction".
Non-Final Office Action mailed Nov. 24, 2015 in U.S. Appl. No. 13/926,193, 16 pages.
Non-Final Office Action mailed Feb. 1, 2016 in U.S. Appl. No. 13/943,310, 30 pages.
Non-Final Office Action mailed Dec. 18, 2015 in U.S. Appl. No. 13/943,264, 19 pages.
Final Office Action mailed Oct. 13, 2015 in U.S. Appl. No. 13/926,193, 6 pages.
Final Office Action mailed Mar. 15, 2016 in U.S. Appl. No. 13/926,193, 22 pages.
Non-Final Office Action mailed Jul. 8, 2016 in U.S. Appl. No. 13/926,193, 10 pages.
Notice of Allowance mailed Jul. 6, 2016 in U.S. Appl. No. 13/943,310, 13 pages.
Notice of Allowance mailed Jun. 29, 2016 in U.S. Appl. No. 13/943,264, 20 pages.

* cited by examiner

DEPENDENCE-BASED REPLAY SUPPRESSION

BACKGROUND

Field of the Disclosure

The present disclosure generally relates to processors, and more particularly, to speculative instruction execution suppression.

Description of the Related Art

Processors typically enhance processing efficiency by employing out-of-order execution, whereby instructions are executed in an order different from the program order of the instructions. In replay processors, in addition to out-of-order execution, instructions may be executed speculatively based on an assumption that the memory subsystem will provide requested data prior to the execution of the instruction. For example, a speculative load may be executed based on the assumption that a previous store will have been completed so that the data for the load is available. A scheduler in the processor schedules and tracks speculatively executed instructions. Data from the speculative load may be used by other instructions to perform other operations. These other instructions are referred to as dependent instructions. A dependent or child instruction is an instruction having one or more operands that depend on the execution of other instructions. Multiple levels of dependency may be present in that a particular parent instruction may have a dependent child instruction, and the child instruction may have its own dependent instruction(s). A speculatively executed load instruction may generate invalid results due to a load failure, because the memory subsystem is not ready to provide the data for the load. In response to identifying the invalid status of a speculatively executed instruction, the scheduler may replay or reissue the instruction(s) so that they can be executed with the correct operands. Because the scheduler speculatively issues instructions that span multiple levels of dependency, the number of instructions subject to replay may be significant. Replaying mis-speculated instructions causes a decrease in efficiency of the processor and an increase in power consumption.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION

FIGS. 1-5 illustrate example techniques for suppressing the awakening and execution of dependent instructions of a load instruction in situations where the load instruction is likely to replay due to a store-to-load forwarding failure. In some embodiments, a processor maintains a table of store instructions that are awaiting movement to a load/store unit of the instruction pipeline. The processor predicts dependencies between an incoming load instruction and store instructions in the table. In response to scheduling a load instruction, it is typical to mark dependent instructions of the load instruction as being ready for execution, which is referred to as waking the dependent instructions. Using the store-to-load dependency information, the awakening of dependent instructions of the load instruction may be suppressed responsive to the predicted associated store not having a valid status.

Conventionally, processors perform store-to-load forwarding at a load/store unit (LSU) of the instruction pipeline. In particular, the LSU maintains store instructions received from an arithmetic unit in a store buffer, and forwards store data to a dependent load instruction in response to determining a match between the store and load addresses corresponding to the store and load instructions. Accordingly, store-to-load forwarding at the LSU does not take place until the store data has been moved to the store buffer of the LSU. As disclosed further herein, by employing a prediction of which load instruction is dependent on a given store instruction, the instruction pipeline can perform store-to load forwarding at the arithmetic unit prior to, or concurrent with, movement of the store data to the LSU store buffer. Instructions that are dependent on the load instruction therefore can begin their execution without waiting for the calculation of the store and load addresses, thus reducing instruction execution latency at the instruction pipeline. The store-to-load dependencies can also be used to track the store instruction status so that the awakening of dependent instructions of the load instruction can be suppressed if the store instruction is not yet valid. If the store instruction is not valid, it is likely that the data for the load instruction may not be available, leading to a load failure. A load failure requires replaying of the load instruction and any dependents of the load instruction that had been speculatively executed. Suppressing the dependent instructions of the load instruction reduces the number of instructions that require replaying due to the load failure and also frees up additional processing resources to execute other instructions. While the techniques are described herein with respect to an example implementation at a fixed point unit, it will be appreciated that the techniques can also be implemented at another arithmetic unit, such as a floating point unit.

Figure 1:
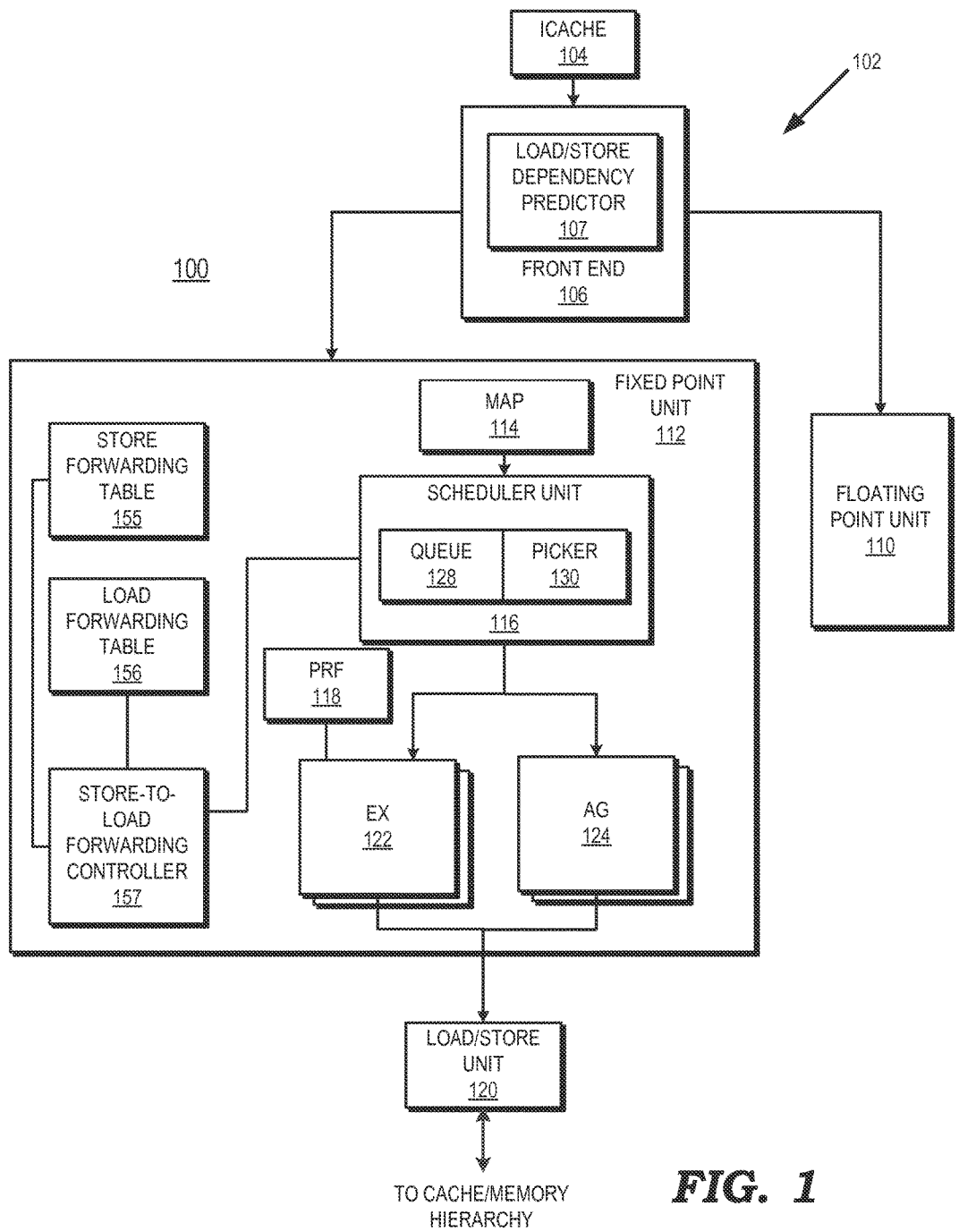
FIG. 1 is a block diagram of a processor core in accordance with some embodiments.

FIG. 1 illustrates a processor core 100 of a processor having an execution pipeline 102 that implements store-to-load forwarding and dependent instruction suppression in accordance with some embodiments. The illustrated processor core 100 can include, for example, a central processing unit (CPU) core based on an x86 instruction set architecture (ISA), an ARM ISA, and the like. The processor can implement a plurality of such processor cores, and the processor can be implemented in any of a variety of electronic devices, such as a notebook computer, desktop computer, tablet computer, server, computing-enabled cellular phone, personal digital assistant (PDA), set-top box, and the like.

In the depicted example, the execution pipeline 102 includes an instruction cache 104, a front end 106, one or more floating point units 110, and one or more fixed point units 112 (also commonly referred to as "integer execution units"). The processor core 100 also includes a load/store unit (LSU) 120 connected to a memory hierarchy, including one or more levels of cache (e.g., L1 cache, L2, cache, etc.), a system memory, such as system RAM, and one or more mass storage devices, such as a solid-state drive (SSD) or an optical drive.

The instruction cache 104 stores instruction data which is fetched by a fetch unit of the front end 106 in response to demand fetch operations (e.g., a fetch to request the next instruction in the instruction stream identified by the program counter) or in response to speculative prefetch operations. The front end 106 decodes instructions fetched by the fetch unit into one or more operations that are to be performed, or executed, by either the floating point unit 110 or the fixed point unit 112. In a microcoded processor architecture, this decoding can include translating the instruction into one or more micro-operations (uOps), whereby each uOp is identified by a corresponding opcode value and can be separately executed within the fixed point unit 112. Those operations involving floating point calculations are dispatched to the floating point unit 110 for execution, whereas operations involving fixed point calculations are dispatched to the fixed point unit 112.

The front end 106 also includes a load/store dependency predictor 107 that predicts if a fetched load instruction is dependent on a previously fetched store instruction. As used herein, Instruction B is dependent on Instruction A if a source operand of Instruction B matches a destination operand of Instruction A, and there are no intervening instructions having the same destination operand as Instruction A. Thus, a load instruction is dependent on a store instruction if the load instruction loads data from a memory address targeted by the store instruction (as indicated by the destination operand of the store instruction), and there are no intervening instructions that store data to the memory address. For example, in the following instruction sequence:

| ST [mem], RAX | (STORE1) |
| LD RBX, [mem] | (LOAD1) |
| ADD RCX, RBX | (ADD1) |
| LD RBX, [mem] | (LOAD2) | the LOAD1 and LOAD2 instructions are both dependent on the STORE1 instruction because the LOAD1 and LOAD2 instructions both load data from the memory address indicated by the destination operand of the STORE1 instruction, and there are no intervening instructions that store data to the memory address. In addition, the ADD 1 instruction is dependent on the LOAD1 instruction because the ADD1 instruction uses the destination operand (RBX) of the LOAD1 instruction as one of its source operands. As used herein, instructions that are dependent on a given load instruction, or that are dependent on instructions that are dependent on the given load instruction, are referred to as the children of the load instruction. In some embodiments, an instruction can be dependent on another instruction only if the instructions share a common operand data type. In some embodiments, an instruction can be dependent on an instruction that has a different operand data type and the instruction pipeline converts the operands to a common data type.

In some embodiments, the load/store dependency predictor 107 predicts dependencies based on the memory address operands of fetched load and store instructions. These predicted dependencies are used for store-to-load forwarding and dependent instruction suppression. In particular, the memory address operand of a load or store instruction identifies values that are used, as described further herein, to calculate the memory address to be accessed by the instruction. Accordingly, the load/store dependency predictor 107 can perform a defined set of logical operations (e.g. a hash function) on the memory address operand to determine a predicted address. In some embodiments, the set of logical operations is defined such that it can be performed relatively quickly so as not to substantially impact the rate at which the front end 106 processes instructions. Accordingly, the load/store dependency predictor 107 does not have time to calculate the full physical address associated with a load or store instruction, and therefore there is some chance that the predicted address will vary from the full physical address targeted by the load or store instruction.

The load/store dependency predictor 107 compares the predicted address for each load instruction to the predicted address for a set of store instructions, whereby a match in the predicted addresses indicates a prediction that the load instruction is dependent on the matching store instruction. In some embodiments, the set of store instructions is selected by the load/store dependency predictor 107 to reduce the likelihood that there are intervening instructions that sever the dependency between the load and store instructions predicted as dependent. For example, the load/store dependency predictor 107 can apply a sliding window to received load and store instructions, and only compare the predicted address for a load instruction to the predicted addresses of the store instructions that share the window with the load instruction. In response to predicting that a load instruction is dependent on a store instruction, the load/store dependency predictor 107 indicates the dependency to the fixed point unit 112.

The fixed point unit 112 includes a map unit 114, a scheduler unit 116, a physical register file (PRF) 118, and one or more execution (EX) units 122, such as one or more arithmetic logic units (ALUs), and one or more address generation (AG) units 124. The PRF 118 stores a set of physical registers, each of which is associated with a different physical register name (PRN). For convenience, as used herein the PRN can refer to the name of the physical register, and can refer to the physical register that has that name. Thus, for example, "storing data at a PRN" indicates that the data is stored at the physical register identified by the PRN.

The scheduler unit 116 includes a scheduler queue 128 and a picker 130. In an operation of the fixed point unit 112, the map unit 114 receives operations from the decode unit 108 (usually in the form of operation codes, or opcodes). These dispatched operations typically also include, or reference, operands used in the performance of the represented operation, such as a memory address at which operand data is stored, an architected register at which operand data is stored, one or more constant values (also called "immediate values"), and the like. The map unit 114 and the scheduler unit 116 control the selective distribution of operations among the EX units 122 and AG units 124, whereby operations to be performed are queued in the scheduler queue 128 and then picked therefrom by the picker 130 for issue to a corresponding EX unit or AG unit. Typically, each queue entry of the scheduler queue 128 includes a field to store the operation payload or operation identifier (e.g., the opcode for the operation), fields for the addresses or other identifiers of physical registers that contain the source operand(s) for the operation, fields to store any immediate or displacement values to be used the operation, and a destination field that identifies the physical register in which the result of the execution of the corresponding operation is to be stored. For example, a store instruction includes a movement operation to move data to the LSU 120, an architected register operand indicating the PRN that stores the data to be stored (the store data) and address information used to calculate a memory address where the data is to be stored.

Prior to storing an operation in the scheduler queue 128, the map unit 114 performs register renaming whereby external operand names (i.e., architected register names (ARNs)) are translated into internal operand names (i.e., PRNs). This renaming process includes the map unit 114 evaluating a subset of operations including the operation to be queued to identify some dependencies between sources and destinations associated with the operations, and then mapping architected registers to physical registers so as to avoid false dependencies and facilitate parallel execution of independent operations as using register renaming techniques known in the art.

The picker 130 monitors the scheduler queue 128 to identify operations ready for execution, and upon picking an available operation and verifying its operands are ready and available, dispatches the operation to an EX unit or an AG unit. The picker 130 waits to pick operations for a dependent instruction until it receives an indication that the operations for the instructions from which the dependent instruction depends have been satisfied. In response to receiving the indication, the picker 130 sets a status of the dependent instruction to indicate that it can be picked for execution, and picks the dependent instruction according to the availability of the requisite EX unit or AG unit. This setting of the status for the dependent instruction is sometimes referred to as "waking" the dependent instruction. As described in greater detail herein, the waking of dependents of a load instruction may suppressed if an indication is not received that the associated store instruction on which the load instruction is predicted to be dependent on has a valid status. If the store instruction does not have a valid status, it indicates that the store instruction has not been processed and it may be the case that the data for the load instruction is not available, leading to a load failure and a subsequent need to replay the load instruction.

Operations requiring retrieval or storage of data, such as load or store operations, are dispatched by the picker 130 to an AG unit 124, which calculates the memory address associated with the operation and directs the LSU 120 to perform the corresponding memory access using the generated address. Operations requiring numerical manipulations or other arithmetic calculations are dispatched to the appropriate EX unit 122 for execution.

The address generation operations performed by the AG units 124 and the arithmetic operations performed by the EX units 122 typically utilize operand data, in the form of one or both of operands stored in source registers or in immediate/displacement values. The immediate/displacement value used during execution operation is dispatched to the EX/AG unit along with the operation from the scheduler queue 128. The source operands stored in the physical registers are read from the PRF 118 and provided to the corresponding EX/AG unit for use in executing the operation. Typically, these source operands are obtained by initiating a PRF read to the PRF 118.

Load operations performed by the AG unit 124/LSU 120 and arithmetic operations performed by the EX unit 122 result in data that is to be stored in the physical register identified as the destination of the load operation or arithmetic operation. Accordingly, each of the EX unit 122 and the LSU 120, upon generating a result (either by completing an arithmetic operation for the EX unit 122 or by loading data from the memory hierarchy for the LSU 120), initiates a PRF write to the destination PRN of the load instruction.

For store instructions, the picker 130 picks a movement operation associated with the store instruction to cause the EX unit 122 to move the data from the register to the LSU 120. The LSU 120 places the store data into a store queue, and communicates with the memory hierarchy to store the data at the calculated memory address.

The fixed point unit 112 includes a store forward table 155, a load forward table 156, and a store-to-load forwarding (SLF) controller 157 to effectuate store-to-load forwarding. In response to receiving a store instruction at the fixed point unit 112, the SLF controller 157 stores data identifying the store instruction at the store forward table 155. In some embodiments, the SLF controller 157 replaces the oldest store instruction at the store forward table 155 with the most recently received store instruction. In some embodiments, the SLF controller 157 invalidates the entries of selected store instructions based on defined criteria, such as whether the move operation for the store instruction has been completed, whether the store instruction has been flushed from the instruction pipeline, and the like. The SLF controller 157 replaces invalidated entries of the store forward table 155 with a received store instruction first and, if all entries of the store forward table 155 are indicated as valid, replaces the entry corresponding to the oldest store instruction. In some embodiments, only a subset of store instructions are eligible for storage at the store forward table. For example, in some embodiments only store instructions that are indicated as having write access to the PRF 132 and indicated as having access to an operand bypass network of the execution pipeline 102 are eligible to be stored at the store forward table 155.

In response to receiving a load instruction at the fixed point unit 112, the SLF controller 157 determines if the load/store dependency predictor 107 has indicated that the load instruction is predicted to be dependent on a store instruction. If not, the SLF controller 157 indicates to the picker 130 that the load instruction is to be provided to the LSU 120. In response, the picker 130 picks the load instruction. The AG unit 124 calculates the memory address and provides the instruction to the LSU 120 for completion. The LSU 120 can determine, based on the calculated memory address, if the load instruction is dependent on any store instruction at its store queue and, if so, forward the store data for the store instruction to the load instruction. If the load instruction is not dependent on a store instruction at the store queue, the LSU 120 retrieves the load data from the address indicated by the instruction and provides it to the fixed point unit 112, which stores it at the PRN indicated by the destination operand of the load instruction.

If the load/store dependency predictor 107 indicates that the load instruction is dependent on a store instruction, the SLF controller 157 determines if the store instruction is identified at the store forward table 155. If not, the SLF controller 157 indicates to the picker 130 that the load instruction is to be provided to the LSU 120 and the load instruction is processed as described above. If the store instruction is identified at the store forward table 155, the SLF controller 157 allocates an entry at the load forward table 156 for the load instruction and stores information identifying the load instruction, the store instruction upon which it depends, the status of the store instruction, and the PRN for the load instruction at the allocated entry. The allocation of an entry for a load instruction based on the predicted dependency is referred to herein as "linking" the load instruction to the store instruction from which it is predicted to depend.

In response to the picker 130 initiating a movement operation for a store instruction, the SLF controller 157 determines if any allocated entry of the load forward table 156 stores information for a load instruction that is linked to the store instruction. If so, the SLF controller 157 sends control information to the EX unit 122 so that the store data is transferred to the PRN of the load instruction concurrent with the store data being moved to the LSU 120. The store data is thereby forwarded to the dependents of the load instruction prior to completion of the movement of the store data to the LSU 120, reducing the latency of the store instruction. The SLF controller 157 also sets the status of the store instruction to "valid" in the associated entry for the store instruction in the store forwarding table 155 and for the associated load in the load forwarding table 156.

In response to forwarding data from a store instruction to make it available for dependents of the load instruction, the SLF controller 157 sends information to the picker 130 indicating that any dependents of the load instruction can be awoken and selected for execution. Because the store-to-load forwarding is performed concurrent with the store data being moved to the LSU 120, the dependents of the load instruction can be picked earlier, thus reducing execution latency for the dependents.

However, not all load instructions resident in the load forwarding table 156 and linked to store instructions in the store forwarding table 155 are eligible for STL forwarding by the SLF controller 157. Various approaches may be used to determine which instructions are eligible for STL forwarding by the SLF controller 157. In some embodiments, only one load instruction may be the target for forwarded data from a given store instruction. If other load instructions are dependent on the same store instruction, they may only receive forwarded data from the LSU 120. In another example, if a load instruction is dispatched by the front end 106 and the store instruction it is dependent on has already had its movement operation initiated by the picker 130, the load instruction is not eligible for STL forwarding by the SLF controller 157. In some embodiments, STL forwarding may be prevented if the load instruction has a datasize that does not match the datasize of the store instruction.

For cases where a load instruction is linked to a store instruction, but is not eligible for STL forwarding from the SLF controller 157, the awakening of the dependent instructions for the load instruction is initiated when the load instruction is selected by the picker 130. Because the awakening is not predicated based on the picking of the store data movement operation, it is possible that the store instruction associated with the picked load instruction is not yet valid because it has failed to generate an address, data, or some other state required for successful data forwarding. The execution of the load instruction, when the store instruction has not yet been processed results in a load failure, and the load instruction must be replayed. Because the dependents of the load instruction, and possibly the dependent's dependents were also awoken when the load instruction was picked, they may also need to be replayed. Replaying the instructions associated with the load failure consumes processing resources and power. The load-store dependency information provided by the store forwarding table 155 and the load forwarding table 156 is used to suppress the awakening of the dependents of the load instruction if the associated store instruction is not yet valid.

Figure 2:
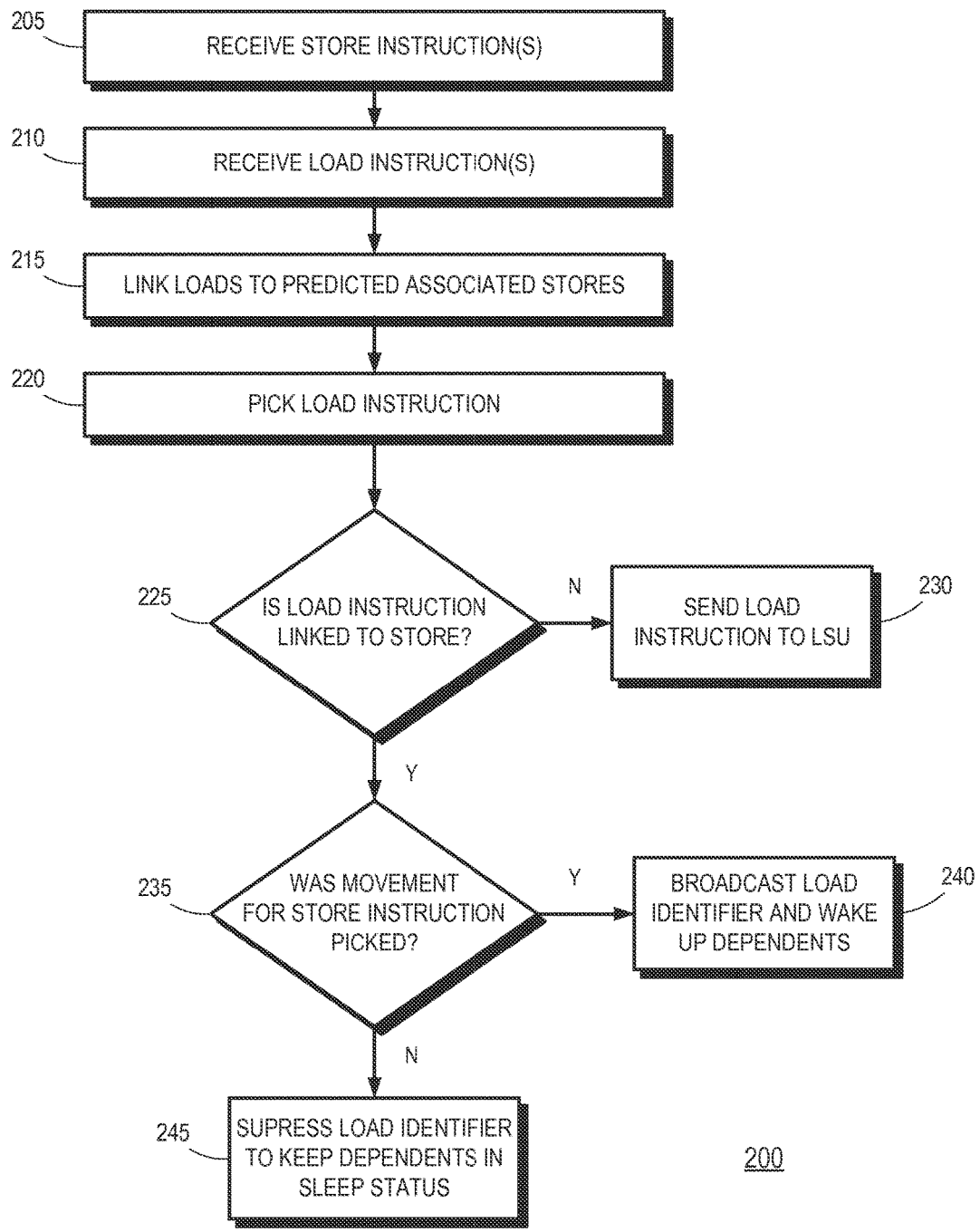
FIG. 2 is a flow diagram of a method for suppressing the wakeup of dependent instructions in accordance with some embodiments.

FIG. 2 is a flow diagram of a method 200 for suppressing the awakening of dependent instructions in accordance with some embodiments. In method block 205, a store instruction or instructions are received at the fixed point unit 112. In response, the SLF controller 157 stores information identifying the store instruction(s) at the store forward table 155. The store instruction operations are stored at the scheduler queue 128. In method block 210, one or more load instructions are received at the fixed point unit 112, and in method block 215, the load/store dependency predictor 107 predicts whether any received load instructions are associated with any store instructions. Accordingly, the SLF controller 157 allocates entries for load instructions at the load forward table 156, thereby linking associated load instructions and store instructions.

The entries for any linked load instructions are maintained at the load forward table 156 for store-to-load forwarding. In method block 220, the picker 130 picks a load instruction and notifies the SLF controller 157 of the pick. In the interim period between method blocks 215 and 220, the movement operation for the predicted associated store instruction may or may not have been picked. When the movement operation is picked, the status of the store instruction is updated in the store forward table 155 and, in some embodiments, the load forward table 156. The picking of the store instruction initiates movement of the store data to the LSU 120.

In method block 225, the SLF controller 157 accesses the load forward table 156 to determine if a picked load instruction is linked to a store instruction. If the load instruction is not linked, the load instruction is sent to the LSU 120 in method block 230. If the load instruction is linked in method block 225, the SLF controller 157 accesses the entry in the load forward table 156 for the picked load instruction and determines the status of the associated store instruction in method block 235. If the store status is updated for the load forward table 156 when the associated store is picked, the SLF controller 157 need only check the load entry to determine the status of the associated store instruction. If the store status indicates the movement for the store instruction was picked in method block 235, indicating that the store instruction is valid, the identifier of the load instruction is broadcast in method block 340 to awake the dependents. If the store status does not indicate that the store movement is picked in method block 235, the load identifier is suppressed in method block 245 to keep the dependents in a sleep status.

If the subsequent execution of the load results in an invalid status result because the store instruction has not yet completed or resulted in an error, the load instruction may need to be replayed, but because the dependents of the load instruction were suppressed, processing resources were not wasted on the dependents and they do not need to be replayed.

Figure 3:
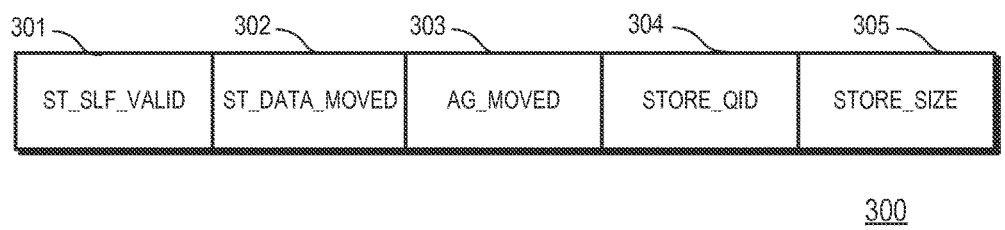
FIG. 3 is a block diagram of an entry of a store forward queue of the processor core of FIG. 1 in accordance with some embodiments.

FIG. 3 illustrates an entry 300 of the store forward table 155 that records information for a received store instruction in accordance with some embodiments. In the example of FIG. 3, the entry 300 stores information for the store instruction. The entry 300 includes a store-to-load forwarding (SLF) valid field 301, a data moved field 302, a queue ID field 303, a store size field 304, and an AG picked field 305. The SLF valid field 301 indicates whether the store instruction is a valid instruction for purposes of store-to-load forwarding at the fixed point unit 112. In particular, in response to receiving a load instruction, the SLF controller 157 determines if the load instruction is dependent on any store instructions that have valid entries in the store forward table 155. Load instructions dependent on store instructions that are absent from the store forward table 155 or having entries at the store forward table 155 in an invalid state are not eligible for store-to-load forwarding at the fixed point unit 112 (although store data may still be forwarded to the load at the LSU 120).

The SLF controller 157 sets the SLF valid field 301 to the valid state in response to a store instruction being stored at the scheduler queue 128. The SLF controller 157 sets the SLF valid field 301 to the invalid state in response to any one of a number of conditions such as: 1) the store instruction is flushed from the execution pipeline 102 (e.g. because the store instruction is part of a mis-speculated instruction stream dispatched in the shadow of a mispredicted branch), 2) the data associated with the store instruction has completed its movement to the LSU 120, so that the store data is no longer available for forwarding at the fixed point unit 112; or 3) the SLF controller 157 has determined that a received load instruction is predicted as dependent on the store instruction. By setting the SLF valid field 301 to the invalid state in response to determining that a load instruction is predicted as dependent on store instruction, the SLF controller 157 ensures that the store data for store instruction can only be forwarded to one load instruction. The SLF valid field 301 identifies that the store instruction is valid for store-to-load forwarding, not whether the store is valid for purposes of awakening or suppressing dependent instructions of a load instruction associated with the store instruction.

The data moved field 302 can be selectively set to one of two different states: an unmoved state, indicating that the store data for the store instruction is not in the process of being moved to the LSU 120, and a moved state indicating that the movement operation for the store instruction has been picked by the picker 130 and the store data is in the process of being moved to the LSU 120. The data moved field 302 is set to the unmoved state in response to the store instruction being stored at the scheduler queue 128 by the picker 130. In response to the movement operation for the store instruction being picked for execution, the picker 130 sets the data moved field 302 to the moved state. In response to receiving an indication that the movement operation for the store instruction was unsuccessful (e.g. an error occurred in the execution of the movement operation), the SLF controller 157 resets the data moved field 302 to the unmoved state. In response to receiving an indication that the movement operation for the store instruction was successful, the SLF controller 157 sets the SLF valid field 301 to the invalid state.

The data moved field 302 is used by the SLF controller 157 to determine when a load instruction can be linked to a store instruction. In particular, if the data moved field 302 is in the moved state, a load instruction cannot be linked to the store instruction associated with that entry of the store forward table 155. The AG moved field 303 is set when the address calculation portion of the store instruction is picked.

The queue ID field 304 stores an identifier (referred to as a queue ID) indicating the entry of the scheduler queue 128 that stores the store instruction. The store size field 305 stores information indicating a size of the store data for the store instruction. In some embodiments, the load/store dependency predictor 107 can predict that a load having a given data operand size is dependent on a store instruction having a different data operand size. In this scenario, forwarding data from the store instruction to the load instruction can result in program execution errors. Accordingly, in response to receiving a prediction that a load is dependent on a store instruction, the SLF controller 157 compares a size of the data operand for the load instruction to the store size field 305. In response to determining a mismatch in the sizes, the SLF controller 157 ensures that the received load instruction is not eligible for store-to-load forwarding, but its dependents may be suppressed as indicated above.

Figure 4:
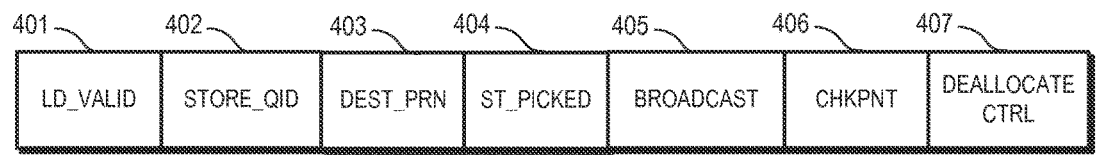
FIG. 4 is a block diagram of an entry of a load forward queue of the processor of FIG. 1 in accordance with some embodiments.

FIG. 4 illustrates an entry 400 of the load forward table 156 that records information for a received load instruction in accordance with some embodiments. In the example of FIG. 4, the entry 400 stores information for the load instruction. The entry 400 includes a validity field 401, a store queue ID field 402, a destination PRN field 403, a broadcast field 404, a store picked field 405, a checkpoint ID field 406, a deallocation control field 407, and a store picked field 408.

The SLF controller 157 can selectively place the validity field 401 in one of two states: a valid state and an invalid state. The SLF controller 157 places the validity field 401 in the valid state in response to 1) receiving the load instruction; 2) determining that the load instruction is predicted as being dependent on a store instruction; 3) the store instruction from which the load instruction is predicted to depend has a valid entry at the store forward table 155; and 4) the store instruction from which the load instruction is predicted to depend has the data moved field 302 in an unmoved state at the store forward table 155. By placing the validity field 401 in the valid state and storing information for the load instruction at the remaining fields of the entry 400, the SLF controller 157 allocates the entry to the load instruction. By placing the validity field 401 in the invalid state, the SLF controller 157 deallocates the entry 400 for load, so that the entry is available for allocation to a different load instruction. The SLF controller 157 places the validity field 401 in the invalid state in response to 1) the load instruction being flushed from the execution pipeline 102; or 2) the EX unit 122 has completed movement of the store data for the store instruction to which the load instruction is linked to the LSU 120 and the load instruction's tag has been broadcast to the scheduler queue 128 to awake the children of the load instruction.

The store queue ID field 402 stores an identifier (the queue ID) indicating the location in the scheduler queue 128 that stores the store instruction to which the load instruction is linked. In response to picking a movement operation for a store instruction, the picker 130 indicates the queue ID for the store instruction to the SLF controller 157, which compares the queue ID to the store queue ID fields for valid entries of the load forward table 156.

The destination PRN field 403 indicates the PRN of PRF 118 that is the destination operand for the load instruction. In response to determining that the load instruction is linked to a store operation whose movement operation has been picked by the picker 130, the SLF controller 157 sends control signaling to the EX unit 122 to copy the store data to the PRN indicated by the PRN field 403. The PRN field 403 is also used as the tag for the load instruction that is broadcast to the scheduler queue 128 to awake the children of the load instruction.

The store picked field 404 indicates that the linked store instruction has been picked and is thus presumed valid and likely not to result in a load failure. A deasserted state of the store picked field 404 indicated an unprocessed status of the store instruction. The SLF controller 157 sets the store picked field 404 to an asserted state responsive to notification from the picker 130 that the address generation movement has completed as indicated in the AG moved field 303 and that the movement operation for the linked store instruction has been picked. The store picked field 404 can be cleared responsive to a store error being identified.

The broadcast field 405 indicates whether the load instruction's tag is being broadcast to awake the load instruction's children. To illustrate, in response to the movement operation for the load instruction's linked store operation being picked for execution, the SLF controller 157 sets the broadcast field 405 to an asserted state and broadcasts the load instruction's tag, thereby notifying the picker 130 that the children of the load instruction are available to be picked for execution, thus waking the load instruction's children concurrently with forwarding store data to the load instruction. The broadcast field 405 can be cleared in response to any of a number of conditions, including the movement operation for the store data resulting in an error or the broadcasting of the load instruction's tag information to the scheduler queue 128. For load instructions that do not participate in forwarding, the load identifier is broadcast when the load instruction is picked and its associated store is valid as indicated in the store picked field 404, otherwise the load identifier broadcast is suppressed, or prevented from being sent to the scheduler queue 128.

After it has been asserted, the SLF controller 157 can clear the broadcast field 405 in response to a number of conditions, including the movement operation of the store data results in an error or the load instruction has been flushed. By clearing the broadcast field 405, the SLF controller 157 indicates to the picker 130 that any children of the load instruction should not be picked for execution.

The checkpoint ID field 406 stores an identifier (referred to as the checkpoint ID) that the SLF controller 157 uses to determine whether the load instruction has been flushed. To illustrate, the execution pipeline 102 periodically stores state information, collectively referred to as a checkpoint, in response to defined events, such as taking a predicted branch. The execution pipeline 102 assigns the checkpoint a checkpoint ID and instructions are associated with the most recent checkpoint ID. In response to determining a defined condition has been met, such as detecting that the predicted branch was the result of a misprediction, the execution pipeline 102 synchronizes its state with the checkpoint associated with the defined condition. This synchronization is referred to as a resync. The resync flushes any instructions that resulted from the misprediction or other defined condition. In response to allocating an entry for a load instruction, the SLF controller 157 stores the checkpoint ID associated with the load instruction at the checkpoint ID field 406. In response to the execution pipeline 102 indicating a resync, the SLF controller 157 compares the checkpoint ID for the resync (the checkpoint ID for the checkpoint to which the execution pipeline is being synchronized) to the checkpoint ID stored at the checkpoint ID field 406. In response to a match, the SLF controller 157 determines that the load instruction for the entry is being flushed, and clears the broadcast field 406 to ensure that the children of the load instruction are not picket for execution. In addition, the SLF controller 157 sets the valid field 401 to the invalid state, thereby deallocating the load instruction for entry 400, thereby preventing store-to-load forwarding at the fixed point unit 112 for the flushed load instruction.

The deallocation control field 407 stores information the SLF controller 157 uses to determine whether to set the valid field 401 to the invalid state, thereby deallocating the load instruction for the entry 400. In some embodiments, the deallocation control field 407 indicates whether movement operation for the store instruction to which the load instruction is linked has been picked and whether the store data for the store instruction has completed its movement to the LSU 120. In response to the deallocation control field 407 indicating that movement of the store data to the LSU 120 is complete and the broadcast field 404 being in a clear state, thus indicating there is not a pending broadcast of the tag for the load instruction, the SLF controller 157 sets the valid field 401 to the invalid state, thereby deallocating the load instruction from the entry 400.

In some embodiments, at least some of the functionality described above may be implemented by one or more processors executing one or more software programs tangibly stored at a computer readable medium, and whereby the one or more software programs comprise instructions that, when executed, manipulate the one or more processors to perform one or more functions of the processing system described above. Further, in some embodiments, serial data interfaces described above are implemented with one or more integrated circuit (IC) devices (also referred to as integrated circuit chips). Electronic design automation (EDA) and computer aided design (CAD) software tools may be used in the design and fabrication of these IC devices. These design tools typically are represented as one or more software programs. The one or more software programs comprise code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer readable storage medium accessible to the computing system. Likewise, the code representative of one or more phases of the design or fabrication of an IC device may be stored in and accessed from the same computer readable storage medium or a different computer readable storage medium.

A computer readable storage medium may include any storage medium, or combination of storage media, accessible by a computer system during use to provide instructions and/or data to the computer system. Such storage media can include, but are not limited to, optical media (e.g., compact disc (CD), digital versatile disc (DVD), or Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Figure 5:
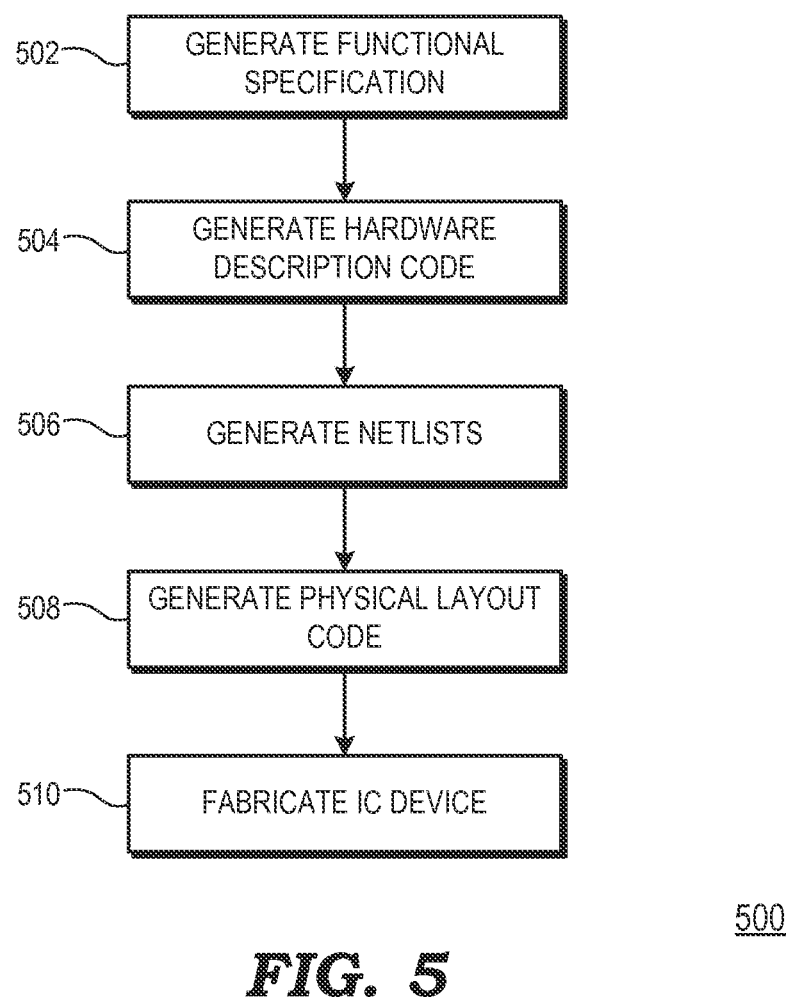
FIG. 5 is a flow diagram illustrating a method for designing and fabricating an integrated circuit device implementing at least a portion of a component of a processor in accordance with some embodiments.

FIG. 5 is a flow diagram illustrating an example method 500 for the design and fabrication of an IC device implementing one or more aspects in accordance with some embodiments. As noted above, the code generated for each of the following processes is stored or otherwise embodied in computer readable storage media for access and use by the corresponding design tool or fabrication tool.

At block 502 a functional specification for the IC device is generated. The functional specification (often referred to as a micro architecture specification (MAS)) may be represented by any of a variety of programming languages or modeling languages, including C, C++, SystemC, Simulink, or MATLAB.

At block 504, the functional specification is used to generate hardware description code representative of the hardware of the IC device. In some embodiments, the hardware description code is represented using at least one Hardware Description Language (HDL), which comprises any of a variety of computer languages, specification languages, or modeling languages for the formal description and design of the circuits of the IC device. The generated HDL code typically represents the operation of the circuits of the IC device, the design and organization of the circuits, and tests to verify correct operation of the IC device through simulation. Examples of HDL include Analog HDL (AHDL), Verilog HDL, SystemVerilog HDL, and VHDL. For IC devices implementing synchronized digital circuits, the hardware descriptor code may include register transfer level (RTL) code to provide an abstract representation of the operations of the synchronous digital circuits. For other types of circuitry, the hardware descriptor code may include behavior-level code to provide an abstract representation of the circuitry's operation. The HDL model represented by the hardware description code typically is subjected to one or more rounds of simulation and debugging to pass design verification.

After verifying the design represented by the hardware description code, at block 506 a synthesis tool is used to synthesize the hardware description code to generate code representing or defining an initial physical implementation of the circuitry of the IC device. In some embodiments, the synthesis tool generates one or more netlists comprising circuit device instances (e.g., gates, transistors, resistors, capacitors, inductors, diodes, etc.) and the nets, or connections, between the circuit device instances. Alternatively, all or a portion of a netlist can be generated manually without the use of a synthesis tool. As with the hardware description code, the netlists may be subjected to one or more test and verification processes before a final set of one or more netlists is generated.

Alternatively, a schematic editor tool can be used to draft a schematic of circuitry of the IC device and a schematic capture tool then may be used to capture the resulting circuit diagram and to generate one or more netlists (stored on a computer readable media) representing the components and connectivity of the circuit diagram. The captured circuit diagram may then be subjected to one or more rounds of simulation for testing and verification.

At block 508, one or more EDA tools use the netlists produced at block 506 to generate code representing the physical layout of the circuitry of the IC device. This process can include, for example, a placement tool using the netlists to determine or fix the location of each element of the circuitry of the IC device. Further, a routing tool builds on the placement process to add and route the wires needed to connect the circuit elements in accordance with the netlist(s). The resulting code represents a three-dimensional model of the IC device. The code may be represented in a database file format, such as, for example, the Graphic Database System II (GDSII) format. Data in this format typically represents geometric shapes, text labels, and other information about the circuit layout in hierarchical form.

At block 510, the physical layout code (e.g., GDSII code) is provided to a manufacturing facility, which uses the physical layout code to configure or otherwise adapt fabrication tools of the manufacturing facility (e.g., through mask works) to fabricate the IC device. That is, the physical layout code may be programmed into one or more computer systems, which may then control, in whole or part, the operation of the tools of the manufacturing facility or the manufacturing operations performed therein.

As disclosed herein, in some embodiments a method includes selecting for execution in a processor a load instruction having at least one dependent instruction. Responsive to selecting the load instruction, the at least one dependent instruction is selectively awakened based on a status of a store instruction associated with the load instruction to indicate that the at least one dependent instruction is eligible for execution.

As disclosed herein, in some embodiments a processor includes an instruction pipeline having an execution unit to execute instructions, a scheduler, and a controller. The scheduler select for execution in the execution unit a load instruction having at least one dependent instruction. The controller, responsive to the scheduler selecting the load instruction, selectively awakes the at least one dependent instruction based on a status of a store instruction associated with the load instruction to indicate that the at least one dependent instruction is eligible for execution by the execution unit.

As disclosed herein, in some embodiments a non-transitory computer readable medium stores code to adapt at least one computer system to perform a portion of a process to fabricate at least part of a processor. The processor includes an instruction pipeline having an execution unit to execute instructions, a scheduler, and a controller. The scheduler select for execution in the execution unit a load instruction having at least one dependent instruction. The controller, responsive to the scheduler selecting the load instruction, selectively awakes the at least one dependent instruction based on a status of a store instruction associated with the load instruction to indicate that the at least one dependent instruction is eligible for execution by the execution unit.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed.

Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

What is claimed is:

1. A method comprising:
   selecting for execution in a processor a load instruction having at least one dependent instruction; and
   responsive to selecting the load instruction, selectively awakening the at least one dependent instruction to indicate that the at least one dependent instruction is eligible for execution based on a status of a store instruction associated with the load instruction.

2. The method of claim 1, further comprising associating the store instruction with the load instruction by predicting that the load instruction is dependent on the store instruction.

3. The method of claim 1, wherein selectively awakening the at least one dependent instruction further comprises awakening the at least one dependent instruction responsive to the store instruction being selected for execution.

4. The method of claim 3, wherein selectively awakening the at least one dependent instruction further comprises awakening the at least one dependent instruction responsive to an address generation operation for the store instruction being selected for execution and a movement operation for the store instruction being selected for execution.

5. The method of claim 3, wherein waking the at least one dependent instruction further comprises broadcasting a load identifier associated with the load instruction to a scheduler of the processor.

6. The method of claim 1, wherein selectively awakening the at least one dependent instruction further comprises suppressing a broadcast of a load identifier associated with the load instruction to a scheduler of the processor based on an unprocessed status of the associated store instruction.

7. The method of claim 1, further comprising:
storing the store instruction at a first table;
storing the load instruction at a second table in response to the store instruction being stored at the first table and the load instruction being predicted to depend from the store instruction; and
storing the status of the store instruction in an entry associated with the load instruction in the second table.

8. A processor comprising:
an instruction pipeline, comprising:
an execution unit to execute instructions;
a scheduler to select for execution in the execution unit a load instruction having at least one dependent instruction; and
a controller to, responsive to the scheduler selecting the load instruction, selectively awaken the at least one dependent instruction to indicate that the at least one dependent instruction is eligible for execution by the execution unit based on a status of a store instruction associated with the load instruction.

9. The processor of claim 8, wherein the instruction pipeline further comprises a front end to provide a prediction that the load instruction is dependent on the store instruction.

10. The processor of claim 9, wherein the controller is to store the store instruction at a first table, store the load instruction at a second table in response to the store instruction being stored at the first table and the front end predicting the load instruction to depend from the store instruction, and store the status of the store instruction in an entry associated with the load instruction in the second table.

11. The processor of claim 8, wherein the controller is to selectively awaken the at least one dependent instruction responsive to the store instruction being selected for execution by the scheduler.

12. The processor of claim 11, wherein the controller is to selectively awaken the at least one dependent instruction responsive to responsive to an address generation operation for the store instruction being selected for execution and a movement operation for the store instruction being selected for execution by the scheduler.

13. The processor of claim 11, wherein the controller is to awaken the at least one dependent instruction by broadcasting a load identifier associated with the load instruction to the scheduler.

14. The processor of claim 8, wherein the controller is to suppress a broadcast of a load identifier associated with the load instruction to the scheduler responsive based on an unprocessed status of the associated store instruction.

15. A non-transitory computer readable medium storing code to adapt at least one computer system to perform a portion of a process to fabricate at least part of a processor comprising:
an instruction pipeline, comprising:
an execution unit to execute instructions;
a scheduler to select for execution in the execution unit a load instruction having at least one dependent instruction; and
a controller to, responsive to the scheduler selecting the load instruction, selectively awaken the at least one dependent instruction based on a status of a store instruction associated with the load instruction to indicate that the at least one dependent instruction is eligible for execution.

16. The non-transitory computer readable medium of claim 15, wherein the instruction pipeline further comprises a front end to provide a prediction that the load instruction is dependent on the store instruction.

17. The non-transitory computer readable medium of claim 15, wherein the controller is to selectively awaken the at least one dependent instruction responsive to the store instruction being selected for execution by the scheduler.

18. The non-transitory computer readable medium of claim 17, wherein the controller is to awaken the at least one dependent instruction by broadcasting a load identifier associated with the load instruction to the scheduler.

19. The non-transitory computer readable medium of claim 16, wherein the controller is to store the store instruction at a first table, store the load instruction at a second table in response to the store instruction being stored at the first table and the front end predicting the load instruction to depend from the store instruction, and store the status of the store instruction in an entry associated with the load instruction in the second table.

20. The non-transitory computer readable medium of claim 15, wherein the controller is to suppress a broadcast of a load identifier associated with the load instruction to the scheduler based on an unprocessed status of the associated store instruction.

* * * * *